United States Patent
Bae et al.

(10) Patent No.: US 10,790,708 B2
(45) Date of Patent: *Sep. 29, 2020

(54) WIRELESS CHARGING APPARATUS

(71) Applicant: LG INNOTEK CO., LTD., Seoul (KR)

(72) Inventors: Seok Bae, Seoul (KR); Ji Yeon Song, Seoul (KR); Won Ha Moon, Seoul (KR); Sang Won Lee, Seoul (KR); Jong Hyuk Lee, Seoul (KR); Soon Young Hyun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 244 days.

This patent is subject to a terminal disclaimer.

(21) Appl. No.: 15/946,419

(22) Filed: Apr. 5, 2018

(65) Prior Publication Data

US 2018/0233968 A1     Aug. 16, 2018

Related U.S. Application Data

(63) Continuation of application No. 14/812,536, filed on Jul. 29, 2015, now Pat. No. 9,973,026.

(30) Foreign Application Priority Data

Jul. 29, 2014   (KR) .................. 10-2014-0096641

(51) Int. Cl.
*H02J 50/70* (2016.01)
*H01F 38/14* (2006.01)
(Continued)

(52) U.S. Cl.
CPC .............. *H02J 50/70* (2016.02); *H01F 38/14* (2013.01); *H02J 7/025* (2013.01); *H02J 50/12* (2016.02); *H01F 1/15308* (2013.01)

(58) Field of Classification Search
None
See application file for complete search history.

(56) References Cited

U.S. PATENT DOCUMENTS

| | | |
|---|---|---|
| 4,881,989 A | 11/1989 | Yoshizawa et al. |
| 5,449,419 A | 9/1995 | Suzuki et al. |
| (Continued) | | |

FOREIGN PATENT DOCUMENTS

| | | |
|---|---|---|
| EP | 1925686 A1 | 5/2008 |
| EP | 2690636 A1 | 1/2014 |
| (Continued) | | |

OTHER PUBLICATIONS

European Search Report dated Nov. 26, 2015 in European Application No. 15178727.2.
(Continued)

*Primary Examiner* — Kevin M Bernatz
(74) *Attorney, Agent, or Firm* — Saliwanchik, Lloyd & Eisenschenk

(57) ABSTRACT

Disclosed are a soft magnetic alloy and a wireless charging apparatus including the soft magnetic alloy. The soft magnetic alloy has a chemical formula expressed as $Fe_{100-x-y}Cu_xB_y$ (wherein x ranges from 0.1 at % to 1.7 at % and y ranges from 2.3 at % to 9.6 at %). Without adding any expensive alloying element, only iron (Fe), copper (Cu), and boron (B) are used to obtain a nanocrystalline soft magnetic alloy that has a low coercive force and a high saturation magnetic flux density. The nanocrystalline soft magnetic alloy is applied to a wireless power transmitter and a wireless power receiver. Thereby, it is possible to make a shield member thin and increase a power transmission capacity. The soft magnetic alloy is easily processed into a flake form. The soft magnetic alloy processed in this way is (Continued)

applied to the shield member. Thereby, it is possible to increase permeability in a surface direction.

9 Claims, 6 Drawing Sheets

(51) Int. Cl.
    *H01F 1/153*     (2006.01)
    *H02J 50/12*     (2016.01)
    *H02J 7/02*     (2016.01)

(56) References Cited

U.S. PATENT DOCUMENTS

| | | | |
|---|---|---|---|
| 5,922,143 | A | 7/1999 | Verin et al. |
| 7,358,844 | B2 | 4/2008 | Guenther et al. |
| 8,414,712 | B2 | 4/2013 | Yoshizawa et al. |
| 9,178,369 | B2 | 11/2015 | Partovi |
| 9,224,527 | B2 | 12/2015 | Ohta et al. |
| 9,287,028 | B2 | 3/2016 | Urata et al. |
| 9,973,026 | B2 * | 5/2018 | Bae .................. H02J 50/10 |
| 10,115,509 | B2 * | 10/2018 | Ohta .................. C22C 33/003 |
| 10,316,396 | B2 * | 6/2019 | Theisen .................. C21D 1/62 |
| 10,347,405 | B2 * | 7/2019 | Herzer .................. C22C 45/02 |
| 2009/0266448 | A1 | 10/2009 | Ohta et al. |
| 2010/0040503 | A1 | 2/2010 | Yoshizawa et al. |
| 2010/0108196 | A1 | 5/2010 | Ohta et al. |
| 2011/0272065 | A1 | 11/2011 | Ohta et al. |
| 2012/0235636 | A1 | 9/2012 | Partovi |
| 2012/0262266 | A1 | 10/2012 | Herzer et al. |
| 2012/0318412 | A1 | 12/2012 | Ohta et al. |
| 2013/0214893 | A1 | 8/2013 | Petzold |
| 2014/0104024 | A1 | 4/2014 | Herzer et al. |
| 2014/0145674 | A1 | 5/2014 | Jang et al. |
| 2014/0152416 | A1 | 6/2014 | Herzer et al. |
| 2015/0243421 | A1 | 8/2015 | Ohta et al. |
| 2016/0196908 | A1 | 7/2016 | Ohta et al. |

FOREIGN PATENT DOCUMENTS

| | | |
|---|---|---|
| JP | 2008-112830 A | 5/2008 |
| KR | 10-1147570 B1 | 5/2012 |
| WO | WO-2013/092305 A1 | 6/2013 |
| WO | WO-2013/094690 A1 | 6/2013 |
| WO | WO-2014/038705 A1 | 3/2014 |

OTHER PUBLICATIONS

Office Action dated Nov. 29, 2017 in European Application No. 15178727.2.

Office Action dated May 28, 2020 in Korean Application No. 10-2014-0096641.

* cited by examiner

WIRELESS CHARGING APPARATUS

CROSS-REFERENCE TO RELATED APPLICATIONS

This application is a continuation of U.S. application Ser. No. 14/812,536, filed Jul. 29, 2015, now U.S. Pat. No. 9,973,026, issued May 15, 2018, which claims the benefit under 35 U.S.C. § 119 of Korean Patent Application No. 10-2014-0096641, filed Jul. 29, 2014, all of which are hereby incorporated by reference in their entirety.

BACKGROUND

Field of the Invention

The present invention relates to a wireless charging apparatus.

Discussion of Related Art

Ferrous soft magnetic alloys used in magnetic cores include iron-silicon (Fe—Si) alloys, amorphous alloys, nanocrystalline alloys, and so on. Here, the Fe—Si alloys have low resistivity and are rarely applied to shield members of wireless power transceiving systems using a high-frequency band, and the amorphous alloys and the nanocrystalline alloys can be applied to the shield members of the wireless power transceiving systems, but make it difficult to reduce thicknesses of the shield members and to increase a power transmission capacity due to a low saturation magnetic flux density. Further, the ferrous soft magnetic alloys have a low glass forming ability, and thus crystalline phases such as $Fe_2B$, $Fe_{23}B_6$, etc. are generated according to a solidification rate to increase a coercive force. The ferrous soft magnetic alloys have a high content of a metalloid, and thus are rarely processed into a flake form.

BRIEF SUMMARY

The present invention is directed to a wireless charging apparatus constituting a wireless charging system.

According to an aspect of the present invention, there is provided a wireless charging apparatus which includes: a soft magnetic material; and a coil disposed on the soft magnetic material. The soft magnetic material includes a soft magnetic alloy that has a chemical formula expressed as $Fe_{100-x-y}Cu_xB_y$ (where x ranges from 0.1 at % to 1.7 at % and y ranges from 2.3 at % to 9.6 at %) and grains with a size from 10 nm to 99 nm.

Here, the soft magnetic alloy may have a flake form.

Further, the soft magnetic alloy may be processed into the flake form through a ball milling process.

Also, the soft magnetic alloy may be subjected to a heat treatment process in the flake form to remove residual stress.

Here, the heat treatment process may be performed at a temperature of 250° C. to 450° C. Further, the flake form may have an aspect ratio of 10 or more.

Meanwhile, the soft magnetic alloy may have a saturation magnetic flux density of 1.7 T or more and a coercive force of 40 Oe or less.

Further, the grains may be formed in an amorphous matrix made by solidifying the Fe—Cu—B alloy in a molten state using a water quenching method.

Here, the Fe—Cu—B alloy for the grains may be heated to a temperature of 1700° C. or more for the molten state.

Further, the grains may each be formed in such a manner that Fe and B are bonded to Cu acting as a crystalline nucleus.

Also, saturation magnetization of the soft magnetic alloy may have an absolute value of at least 190 emu/g.

Further, the wireless charging apparatus may further include: a wireless power transmitter that includes a soft magnetic core containing the soft magnetic alloy and a transmission coil; and a wireless power receiver that includes a soft magnetic sheet containing the soft magnetic alloy and a reception coil.

Further, a permanent magnet may be disposed on the soft magnetic core.

In addition, a near field communication (NFC) antenna may be disposed is disposed on the soft magnetic sheet.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
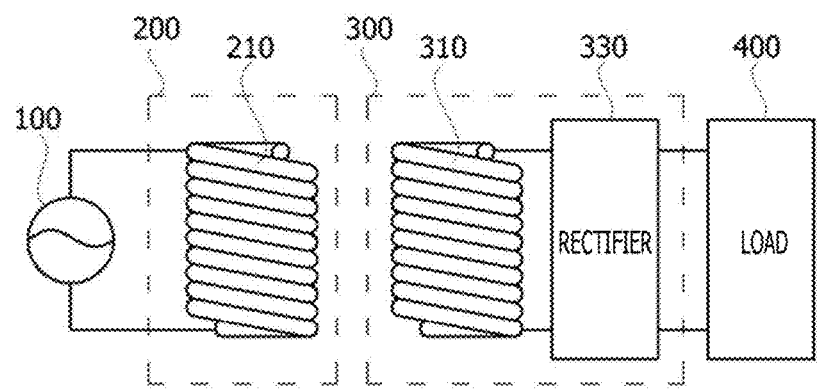
FIG. 1 is a view showing a wireless charging system according to an embodiment.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Unless otherwise defined, all terms used herein, including technical or scientific terms, have the same meanings as those generally understood by those with ordinary knowledge in the field of art to which the invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

It will be understood that, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components, and/or combinations thereof, but do not preclude the presence or addition of one or more other features, integers, steps, operations, elements, components, and/or combinations thereof.

Exemplary embodiments of the present invention will be described in detail below with reference to the accompanying drawings, and description of the known configuration irrelevant to the gist of the present invention will be omitted, Note that, in giving reference numerals or symbols to the components in the drawings, the same reference numerals or symbols are given to the same components even among the different drawings as far as possible.

FIG. 1 is a view showing a wireless charging system according to an embodiment.

Referring to FIG. 1, a wireless charging system according to an embodiment includes a power supply 100, a wireless power transmitter 200, a wireless power receiver 300, and a load 400. The wireless power transmitter 200 includes a transmission coil 210, and the wireless power receiver 300 includes a reception coil 310 and a rectifier 330.

The power supply 100 supplies the wireless power transmitter 200 with alternating current (AC) power having a predetermined frequency. The wireless power transmitter 200 wirelessly transmits the AC power to the wireless power receiver 300 using a magnetic induction or resonance system. Here, the magnetic induction system is a wireless power transmission system that uses an AC magnetic field of 110 kHz to 205 kHz as an energy transfer medium, and the magnetic resonance system is a wireless power transmission system that uses an AC magnetic field of 6.78 MHz.

In the magnetic induction system, when an electric current is applied to the transmission coil 210 of the wireless power transmitter 200, the AC magnetic field is generated. Due to this AC magnetic field, a change in voltage is induced at the reception coil 310 of the wireless power receiver 300 that is magnetically coupled with the transmission coil 210, is converted into a direct current (DC) voltage by the rectifier 330. The DC voltage is supplied to the load 400. Here, the load 400 may be a battery or a device in which such a battery is mounted. The wireless power receiver 300 and the load 400 may be included in a single device.

For example, the wireless power receiver 300 and the load 400 of the wireless charging system according to the embodiment may be included in a smart phone, a feature phone, a tablet personal computer (PC), a portable computer, a personal digital assistant (PDA), or a phablet that is a smart phone having a function of a tablet. Further, the wireless power transmitter 200 of the wireless charging system according to the embodiment may be configured in the form of a pad on which a mobile device can be placed, but the present invention is not limited thereto. The power supply 100 and the wireless power transmitter 200 may be included in a single device.

Meanwhile, in the magnetic resonance system, each of the transmission coil 210 of the wireless power transmitter 200 and the reception coil 310 of the wireless power receiver 300 may be made up of an induction coil and a resonance coil. Here, an impedance and an LC resonance frequency of the resonance coil of the wireless power transmitter 200 should be matched with those of the resonance coil of the wireless power receiver 300, respectively.

Figure 2:
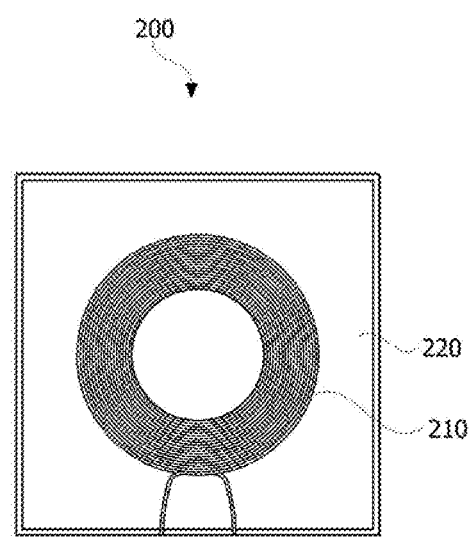
FIG. 2 is a view showing the wireless power transmitter according to the embodiment.

FIG. 2 is a view showing the wireless power transmitter according to the embodiment.

Referring to FIG. 2, the wireless power transmitter 200 according to the embodiment includes the transmission coil 210 and a soft magnetic core 220. The transmission coil 210 is disposed on the soft magnetic core 220. Although not shown in the figure, a permanent magnet may be further disposed on the soft magnetic core 220. This permanent magnet may be enclosed by the transmission coil 210.

Especially, the soft magnetic core 220 includes a soft magnetic alloy according to an embodiment of the present invention, i.e., a soft magnetic alloy having a chemical formula expressed as $Fe_{100-x-y}Cu_xB_y$ (where x ranges from 0.1 at % to 1.7 at % and y ranges from 2.3 at % to 9.6 at %). The soft magnetic alloy has a saturation magnetic flux density of 1.7 T or more, a coercive force of 40 Oe or less, grains having sizes of tens of nanometers, and a flake form.

Figure 3:
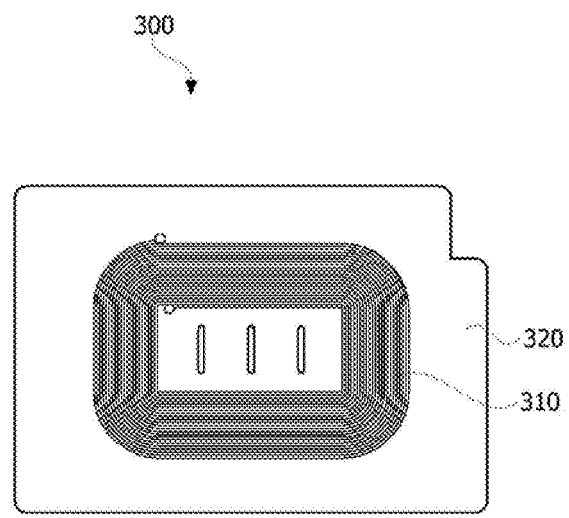
FIG. 3 is a view showing the wireless power receiver according to the embodiment

FIG. 3 is a view showing the wireless power receiver according to the embodiment.

Referring to FIG. 3, the wireless power receiver 300 according to the embodiment includes a reception coil 310 and a soft magnetic sheet 320. The reception coil 310 is disposed on the soft magnetic sheet 320. Although not shown in the figure, a near field communication (NFC) antenna for short range communication may be further disposed on the soft magnetic sheet 320. This permanent magnet may be enclosed by the transmission coil 210.

Especially, the soft magnetic sheet 320 includes a soft magnetic alloy according to an embodiment of the present invention, i.e., a soft magnetic alloy having a chemical formula expressed as $Fe_{100-x-y}Cu_xB_y$ (where x ranges from 0.1 at % to 1.7 at % and y ranges from 2.3 at % to 9.6 at %). The soft magnetic alloy has a saturation magnetic flux density of 1.7 T or more, a coercive force of 40 Oe or less, grains having sizes of tens of nanometers, and a flake form.

Tables 1 to 4 show compositions (at %), saturation magnetization (emu/g), saturation magnetic flux densities (T), coercive forces (Oe), and pass/fail (P/F) of the soft magnetic alloys according to Comparative Examples and Examples.

TABLE 1

| | | $Fe_{100-x-y}Cu_xB_y$ | | | |
|---|---|---|---|---|---|
| | Composition (at %) | Saturation magnetization (emu/g) | Saturation magnetic flux density (T) | Coercive force (Oe) | Pass/Fail (P/F) |
| Comparative Example 1 | x = 0, y = 9.6 | 192.4 | 1.88 | 43.1 | F |
| Comparative Example 2 | x = 2.4, y = 9.6 | 173.8 | 1.70 | 45.9 | F |

TABLE 1-continued

| | Composition (at %) | Saturation magnetization (emu/g) | Saturation magnetic flux density (T) | Coercive force (Oe) | Pass/Fail (P/F) |
|---|---|---|---|---|---|
| Comparative Example 3 | x = 3.3, y = 9.6 | 168.9 | 1.65 | 49.0 | F |

$Fe_{100-x-y}Cu_xB_y$

TABLE 2

| | Composition (at %) | Saturation magnetization (emu/g) | Saturation magnetic flux density (T) | Coercive force (Oe) | Pass/Fail (P/F) |
|---|---|---|---|---|---|
| Example 1 | x = 0.1, y = 9.6 | 190.4 | 1.86 | 37.8 | P |
| Example 2 | x = 0.8, y = 9.6 | 187.4 | 1.83 | 35.2 | P |
| Example 3 | x = 1.2, y = 9.6 | 183.7 | 1.80 | 32.3 | P |
| Example 4 | x = 1.7, y = 9.6 | 181.5 | 1.77 | 38.8 | P |

$Fe_{100-x-y}Cu_xB_y$

Referring to Tables 1 and 2, Comparative Examples 1 to 3 and Examples 1 to 4 show results of a test in which a content of boron (B) was fixed at 9.6 at % and a content of copper (Cu) was changed from 0 at % to 3.3 at %. Here, it can be found that, as the content of copper acting as a seed creating a nucleus due to a greater atomic radius than iron (Fe) is increased, the saturation magnetization of the soft magnetic alloy containing Cu and the saturation magnetic flux density proportional to the saturation magnetization are reduced. Further, the coercive force that is a magnetic characteristic representative of soft magnetism is preferably as low as possible. In detail, an alloy whose coercive force exceeds 40 Oe is unfit for use as a soft magnetic member. Therefore, in the soft magnetic alloy having the chemical formula expressed as $Fe_{100-x-y}Cu_xB_y$, the content of Cu is preferably limited to a range from 0.1 at % to 1.7 at %.

Referring to Tables 3 and 4, Comparative Examples 4 to 6 and Examples 5 to 7 show results of a test in which a content of Cu was fixed at 1.2 at % and a content of B was changed from 1.2 at % to 18.5 at %. Here, since B has a smaller atomic radius than Fe, it is possible to reduce a liquidus temperature of the alloy to increase a glass forming ability. However, if B is excessively added, crystalline phases such as $Fe_2B$, $Fe_{23}B_6$, etc. are generated to be able to increase the coercive force. As the content of the non-magnetic alloying element increases, the saturation magnetic flux density is reduced. Therefore, in the soft magnetic alloy having the chemical formula expressed as $Fe_{100-x-y}Cu_xB_y$, the content of B is preferably limited to a range from 2.3 at % to 9.6 at %.

Consequently, in the soft magnetic alloy having the chemical formula expressed as $Fe_{100-x-y}Cu_xB_y$, when the content of Cu is preferably limited to a range from 0.1 at %

TABLE 3

| | Composition (at %) | Saturation magnetization (emu/g) | Saturation magnetic flux density (T) | Coercive force (Oe) | Pass/Fail (P/F) |
|---|---|---|---|---|---|
| Comparative Example 4 | x = 1.2, y = 1.2 | 195.3 | 1.91 | 41.9 | F |
| Comparative Example 5 | x = 1.2, y = 13.8 | 177.2 | 1.74 | 42.3 | F |
| Comparative Example 6 | x = 1.2, y = 18.5 | 170.2 | 1.67 | 48.3 | F |

$Fe_{100-x-y}Cu_xB_y$

TABLE 4

| | Composition (at %) | Saturation magnetization (emu/g) | Saturation magnetic flux density (T) | Coercive force (Oe) | Pass/Fail (P/F) |
|---|---|---|---|---|---|
| Example 5 | x = 1.2, y = 2.3 | 195.1 | 1.91 | 36.9 | P |
| Example 6 | x = 1.2, y = 4.5 | 190.4 | 1.86 | 31.0 | P |
| Example 7 | x = 1.2, y = 9.6 | 183.7 | 1.80 | 29.1 | P |

$Fe_{100-x-y}Cu_xB_y$ to 1.7 at %, and when the content of B is preferably limited to a range from 2.3 at % to 9.6 at %, it is possible to increase the saturation magnetic flux density to 1.7 T or more while maintaining the coercive force below 40 Oe.

Figure 4:
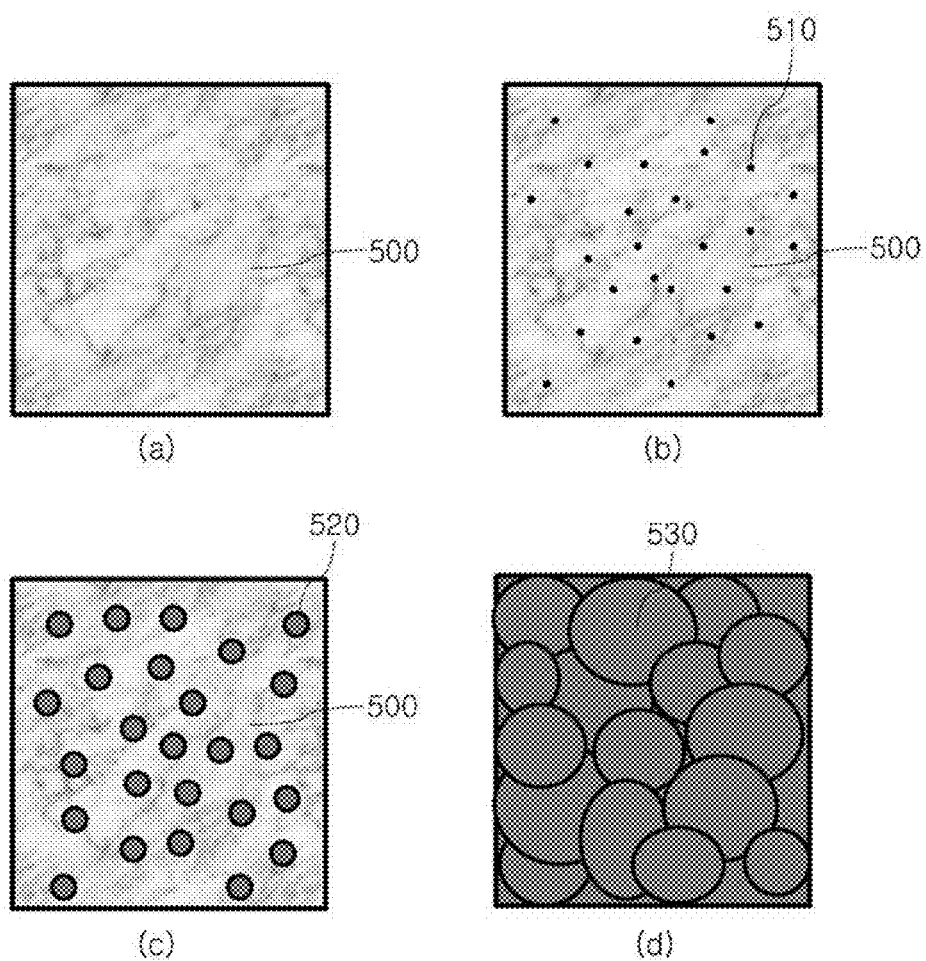
FIG. 4 is a view showing a process of forming grains of the soft magnetic alloy according to the embodiment.

FIG. 4 is a view showing a process of forming grains of the soft magnetic alloy according to the embodiment.

Referring to FIG. 4, an existing ferrous soft magnetic alloy is generally manufactured to have a saturation magnetic flux density of about 1 T to 1.56 T by quenching a molten metal using a melt spinner to form an amorphous phase and then performing a post heat treatment to precipitate nanocrystalline phase nuclei or to grow nanocrystals. However, the soft magnetic alloy according to the embodiment of the present invention is solidified in a molten state by a water quenching method. Thereby, it is possible to obtain an amorphous matrix 500 and nanograins 520 without a post heat treatment process, and thus reduce a time and cost required to manufacture the soft magnetic alloy.

To be specific, in manufacturing a ternary alloy using Fe, Cu, and B without adding any expensive alloying element, the Fe—Cu—B ternary alloy is solidified in a molten state by a water quenching method, so that the matrix 500 can have an amorphous phase. In this process, Cu having a greater atomic radius than Fe can serve as a crystalline nucleus 510, and Fe and B are bonded to Cu so that the nanograin 520 can be created.

Here, the nanograin 520 refers to a crystalline phase having a size of tens of nanometers, i.e. from 10 nm to 99 nm. The soft magnetic alloy according to the embodiment of the present invention can be subjected to plastic deformation because the content of a metalloid, i.e. B, is equal to or less than 10 at %, and be processed into a flake form. In this case, the flake form has an aspect ratio of 10 or more. When the soft magnetic alloy is processed in this way, there is an advantage in that permeability in a major axis direction is increased and shape magnetic anisotropy can be applied. Meanwhile, when the size of the nanograin 520 is beyond the range of tens of nanometers, that is, when the size of the nanograin 520 is merely several nanometers or reaches hundreds of nanometers, the magnetic characteristic is reduced. Especially, when the nanograin 520 grows to a micrograin 530 having a size above several micrometers, the magnetic characteristic may be greatly reduced. For this reason, it is possible to adjust a process time to prevent the nanograin 520 from growing excessively.

Figure 5:
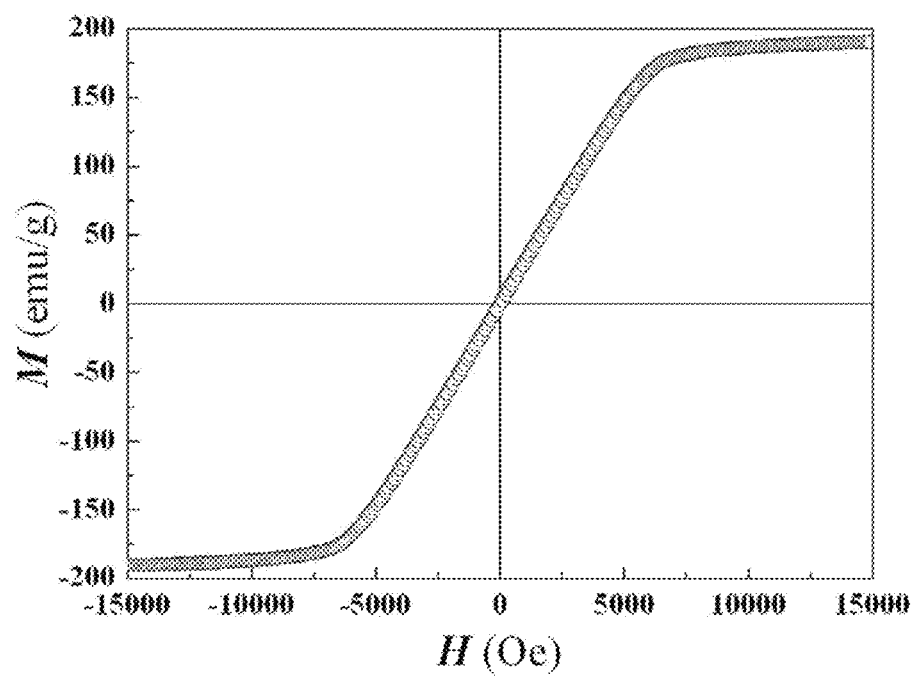
FIG. 5 is a graph showing a change in magnetization according to a strength of a magnetic field applied to the soft magnetic alloy according to the embodiment.

FIG. 5 is a graph showing a change in magnetization according to a strength of a magnetic field applied to the soft magnetic alloy according to the embodiment.

Referring to FIG. 5, when the strength of the magnetic field H applied to the soft magnetic alloy having the chemical formula expressed as $Fe_{100-x-y}Cu_xB_y$ (where x is 1.2 at % and y is 4.5 at %) is increased, a strength of magnetization M of the soft magnetic alloy is increased. However, if the strength of the magnetic field H exceeds about ±7500 Oe, the strength of magnetization M is maintained nearly constant. At this time, the strength of magnetization M is called saturation magnetization. It can be found in the graph that the saturation magnetization of the soft magnetic alloy is shown to be higher than at least ±190 emu/g. The soft magnetic alloy having high saturation magnetization in this way is appropriate for a material of the soft magnetic core of the wireless power transmitter or the soft magnetic sheet of the wireless power receiver.

Figure 6:
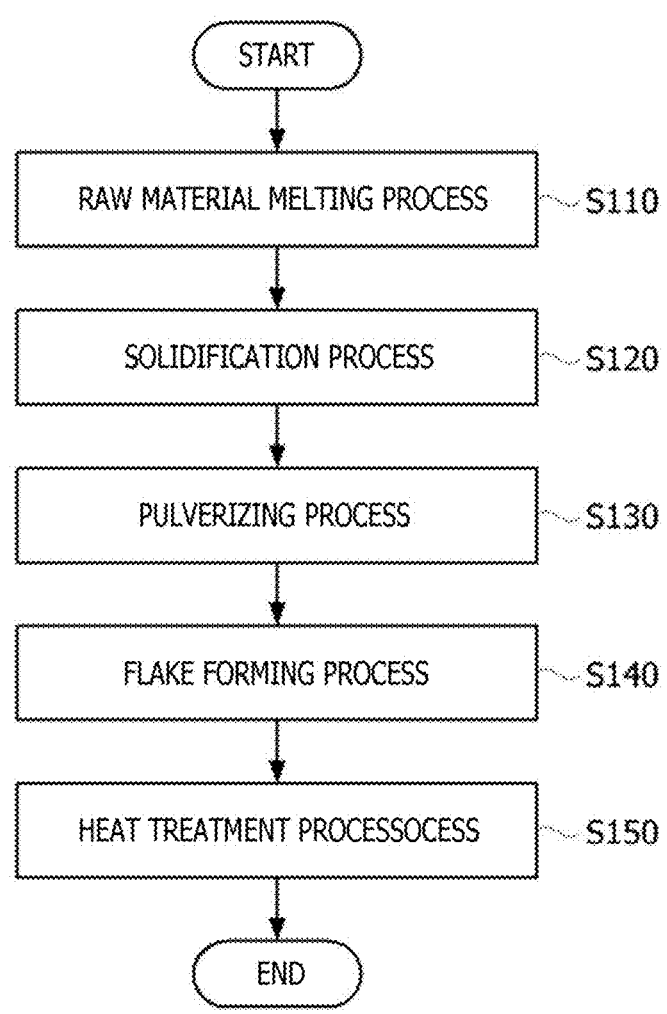
FIG. 6 is a flow chart showing a method of manufacturing the soft magnetic alloy according to the embodiment.
Figure 7:
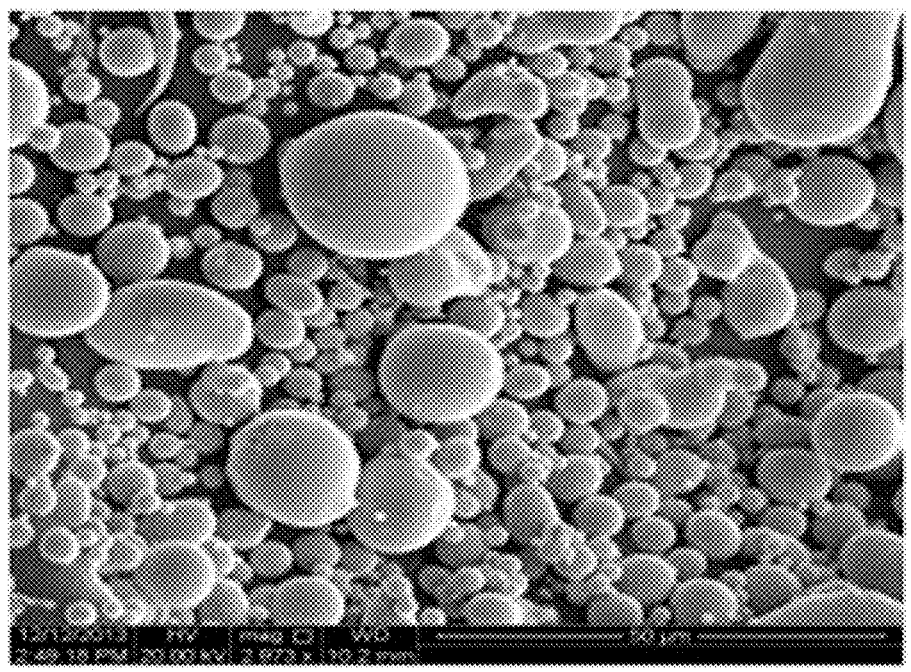
FIGS. 7 and 8 are electron microscope photographs of the soft magnetic alloy according to the embodiment.
Figure 8:
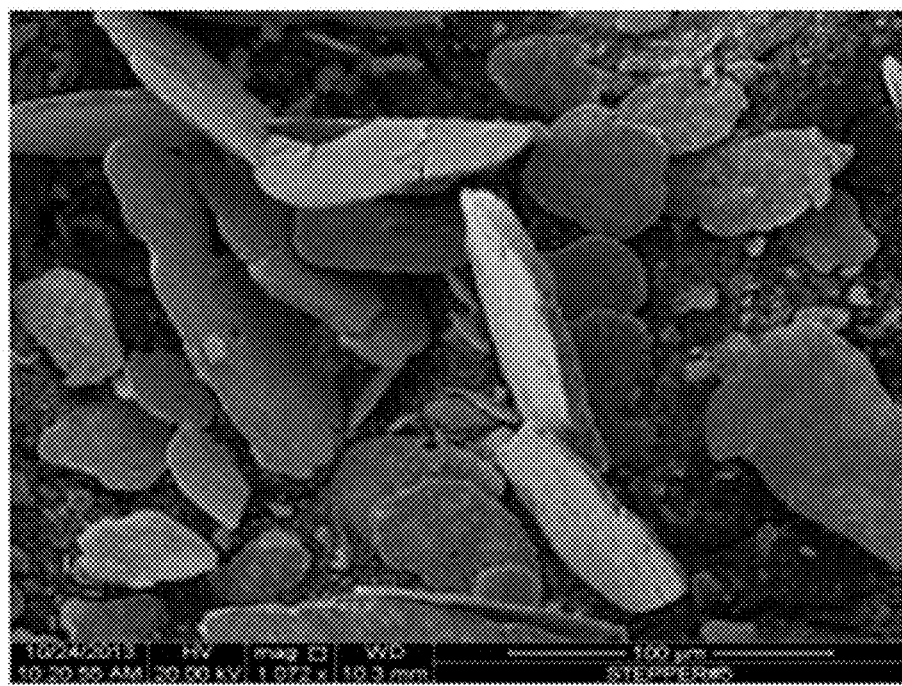

FIG. 6 is a flow chart showing a method of manufacturing the soft magnetic alloy according to the embodiment, and FIGS. 7 and 8 are electron microscope photographs of the soft magnetic alloy according to the embodiment.

Referring to FIGS. 6 to 8, Fe, Cu and B that are raw materials of the soft magnetic alloy according to the embodiment are heated to and melted at a temperature of, for instance, 1700° C. or more (S110), and are solidified by a water quenching method (S120). In this case, the soft magnetic alloy is processed into a spherical powder form using a gas atomizer (S130, see FIG. 7), and the soft magnetic alloy of the spherical powder form is processed into a flake form, for instance, through a ball milling process (S140, see FIG. 8). Meanwhile, to remove residual stress from the soft magnetic alloy, a process of performing a heat treatment at a temperature of 250° C. to 450° C., and preferably 350° C. may be further performed (S150).

According to the embodiment of the present invention, without adding any expensive alloying element, only Fe, Cu, and B are used to obtain the nanocrystalline soft magnetic alloy that has the low coercive force and the high saturation magnetic flux density. The nanocrystalline soft magnetic alloy is applied to the wireless power transmitter and the wireless power receiver. Thereby, it is possible to make a shield member thin and increase a power transmission capacity. The soft magnetic alloy is easily processed into a flake form. The soft magnetic alloy processed in this way is applied to the shield member. Thereby, it is possible to increase permeability in a surface direction.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A soft magnetic material comprising:
a soft magnetic alloy that has a chemical formula expressed as $Fe100—x—yCuxBy$, where x ranges from 0.1 at % to 1.7 at % and y ranges from 2.3 at % to 3.9 at %, and grains with a size from 10 nm to 99 nm,
wherein the soft magnetic alloy has a saturation magnetic flux density of 1.7 T to 1.9 T and a coercive force of 30 Oe to 40 Oe, and
wherein the soft magnetic alloy has a saturation magnetization of 190 emu/g to 200 emu/g in absolute when a magnetic field with a strength exceeding ±7500 Oe is applied to the soft magnetic alloy.

2. The soft magnetic material of claim 1, wherein the soft magnetic alloy has a flake form.

3. The soft magnetic material of claim 2, wherein the soft magnetic alloy is processed into the flake form through a ball milling process.

4. The soft magnetic material of claim 2, wherein the soft magnetic alloy is subjected to a heat treatment process in the flake form to remove residual stress.

5. The soft magnetic material of claim 4, wherein the heat treatment process is performed at a temperature of 250° C. to 450° C.

6. The soft magnetic material of claim 2, wherein the flake form has an aspect ratio of 10 or more.

7. The soft magnetic material of claim 1, wherein the grains are formed in an amorphous matrix made by solidifying the Fe—Cu—B alloy in a molten state using a water quenching method.

8. The soft magnetic material of claim 7, wherein the Fe—Cu—B alloy for the grains is heated to a temperature of 1700° C. for the molten state.

9. The soft magnetic material of claim 1, wherein the grains are each formed in such a manner that Fe and B are bonded to Cu acting as a crystalline nucleus.

* * * * *